(12) United States Patent
Rapoport et al.

(10) Patent No.: US 8,844,470 B2
(45) Date of Patent: Sep. 30, 2014

(54) MANEUVERABLE BED FOR ANALYZED OBJECTS

(75) Inventors: Uri Rapoport, Moshav Ben Shemen (IL); Itzchak Rabinovitz, Nes Ziona (IL)

(73) Assignee: Aspect Imaging Ltd, Shoham (IL)

( * ) Notice: Subject to any disclaimer, the term of this patent is extended or adjusted under 35 U.S.C. 154(b) by 138 days.

(21) Appl. No.: 13/241,350

(22) Filed: Sep. 23, 2011

(65) Prior Publication Data

US 2012/0073510 A1  Mar. 29, 2012

Related U.S. Application Data

(60) Provisional application No. 61/386,606, filed on Sep. 27, 2010.

(51) Int. Cl.
| | | |
|---|---|---|
| *A01K 1/03* | (2006.01) | |
| *A01K 1/06* | (2006.01) | |
| *A61D 3/00* | (2006.01) | |

(52) U.S. Cl.
CPC .............. *A01K 1/0613* (2013.01); *A61D 3/00* (2013.01)
USPC .......................................... 119/420; 119/417

(58) Field of Classification Search
USPC ......... 119/417, 418, 420, 751, 752, 753, 755, 119/756, 757, 174; 5/601, 81.1 RP
See application file for complete search history.

(56) References Cited

U.S. PATENT DOCUMENTS

| | | | | |
|---|---|---|---|---|
| 3,557,785 A | * | 1/1971 | McQueen | 128/205.16 |
| 3,739,751 A | * | 6/1973 | Mohr et al. | 119/752 |
| 6,029,081 A | | 2/2000 | DeMeester et al. | |
| 6,317,618 B1 | | 11/2001 | Livni et al. | |
| 2007/0238946 A1 | * | 10/2007 | Chiodo | 600/407 |
| 2008/0072836 A1 | * | 3/2008 | Chiodo | 119/417 |
| 2008/0168948 A1 | * | 7/2008 | Truitt et al. | 119/417 |
| 2009/0000567 A1 | * | 1/2009 | Hadjioannou et al. | 119/755 |
| 2009/0056639 A1 | * | 3/2009 | Ragatz et al. | 119/417 |
| 2010/0100072 A1 | * | 4/2010 | Chiodo | 604/523 |

* cited by examiner

*Primary Examiner* — Rob Swiatek
*Assistant Examiner* — Lisa Tsang
(74) *Attorney, Agent, or Firm* — The Law Office of Michael E. Kondoudis

(57) ABSTRACT

An animal handling system (AMS), useful for positioning an immobilized animal in a predefined configuration, including: a proximal portion, held outside a medical device, comprises at least one inner shaft, and at least one outer shaft, the at least one outer shaft telescopically maneuverable along the at least one inner shaft to provide a telescopic mechanism of variable (proximal-) length, the proximal portion; and a distal portion comprising a configurable encapsulatable life support system (ELSS), the ELSS is rotatable and/or linearly reciprocatable along the main longitudinal axis of the shafts by means of the maneuverable telescopic mechanism of the proximal portion. The proximal portion further comprising indicia indicating the linear displacement and rotation of the ELSS of the distal portion, such that the ELSS is accurately and reversibly configured within the medical device to optimized animal analyses.

5 Claims, 6 Drawing Sheets

MANEUVERABLE BED FOR ANALYZED OBJECTS

FIELD OF THE INVENTION

The present invention generally pertains to a maneuverable bed for analyzed objects, such as anaesthetized mice and rats scanned within an MRI device and to methods using the same.

BACKGROUND

Animals to be analyzed are positioned within an MRI device in a predefined specific location and configuration. It is advantageous to adjust animal location within the MRI for optimal analysis. Some pertain to means and methods of positioning analyzed animal. Hence for example, U.S. Pat. No. 6,317,618 discloses a transportable magnetic resonance imaging apparatus comprising a transportable platform; a magnetic resonance imaging system mounted onto the transportable platform, the magnetic resonance imaging system including a magnetic structure having a pair of spaced apart magnets bounding an imaging volume of sufficient shape and size to accommodate a patient's body part for imaging; a host computer mounted on the transportable platform and coupled to the magnetic structure so as to process and display a magnetic resonance image; a magnetic flux suppressor provided on the transportable platform; and a positioning assembly configured to move the magnetic structure between a first position in which the pair of spaced apart magnets are positioned within the magnetic flux suppressor so as to suppress the magnetic flux of the pair of spaced apart magnets, and a second position in which the pair of spaced apart magnets are deployed in an arrangement suitable for magnetic resonance imaging.

U.S. Pat. No. 6,029,081 discloses a magnetic resonance apparatus comprising a couch for supporting a subject being examined; and, a main magnet which generates a substantially temporally constant main magnetic field through an examination region, the main magnet having: opposing pole pieces; and, a magnetic flux return path connecting the opposing pole pieces; wherein at least a portion of the magnet is selectively moveable over a range of positions including at least a first position in which a region of interest of the subject is in the examination region and a second position in which the movable portion of the main magnet is displaced from the region of interest of the subject.

None of the above provides a simple solution for precise positioning of the animal within an MRI device. Hence an MRI-compatible and positioning system fulfill a long felt need.

BRIEF SUMMARY

It is thus one object of the invention to disclose an animal handling system (AMS), useful for positioning an immobilized animal in a predefined configuration, comprising: a proximal portion, held outside a medical device, comprising at least one inner shaft and at least one outer shaft, the at least one outer shaft telescopically maneuverable along the at least one inner shaft to provide a telescopic mechanism of variable (proximal-) length; and a distal portion comprising a configurable encapsulatable life support system (ELSS) rotatable and/or linearly reciprocatable along the main longitudinal axis of the shafts by means of the maneuverable telescopic mechanism of the proximal portion; wherein the proximal portion further comprises indicia indicating the linear displacement and rotation of the ELSS of the distal portion, such that the ELSS is accurately and reversibly configured within the medical device to optimized animal analyses.

It is another object of the invention to disclose a maneuverable AMS as defined above, wherein the AMS further comprises a cradle or bed adapted by means of size and shape to accommodate the animal; an anesthetization gas mask (AGM) characterized by a cup of substantially conical shape, comprising a plurality of apertures located at the outer circumference of the cup; a fluid supplying mechanism (FSM) in which the AGM is placed, the FSM in continuous fluid communication with (i) an anesthetization gas inlet positioned outside the ELSS and an outlet located within the ELSS; (ii) an air suction scavenging device positioned outside the ELSM and a mask and an air suction outlet located within the ELSS; and possibly, a plurality of (iii) air conditioning tubes; an airtight shell enveloping the same; wherein the airtight ELSM prevents leakage of anaesthetization gas from the ELSM outwardly to the laboratory; provide thermal isolation between ambient air to the air-conditioned animal environment; and avoid accidental spillage of hazardous materials, such as radioactive agents etc outside mice environment.

It is another object of the invention to disclose an MRI-compatible AMS as defined above, wherein the medical device is an MRD; and/or wherein the AGN, FSM and mechanisms thereof are adapted by means of size and shape, to ensure anaesthetization of animals, especially laboratory animals.

DETAILED DESCRIPTION

The following description is provided in order to enable any person skilled in the art to make use of the invention and sets forth the best modes contemplated by the inventor of carrying out this invention. Various modifications, however, will remain apparent to those skilled in the art, since the generic principles of the present invention have been defined specifically to provide a mask for analyzed mammals and methods using the same.

The term 'Magnetic Resonance Device' (MRD) specifically applies hereinafter to any Magnetic Resonance Imaging (MRI) device, any Nuclear Magnetic Resonance (NMR) spectroscope, any Electron Spin Resonance (ESR) spectroscope, any Nuclear Quadruple Resonance (NQR) spectroscope or any combination thereof. The MRD hereby disclosed is optionally a portable MRI device, such as the ASPECT Magnet Technologies Ltd commercially available devices, or a commercially available non-portable device. Moreover, the term 'MRD' generally refers in this patent to any medical device, at least temporary accommodating an anesthetized animal.

As used herein, the term "animal" or "mouse" generally refers in an interchangeable manner to any living creature, such as neonates, other mammal such as mice, rats, cats, dogs, rabbits etc and laboratory animals.

As used herein, the term "plurality" refers in a non-limiting manner to any integer equal or greater than 1.

The term 'about' refers herein to a value of ±25% of the defined measure.

Figure 1:
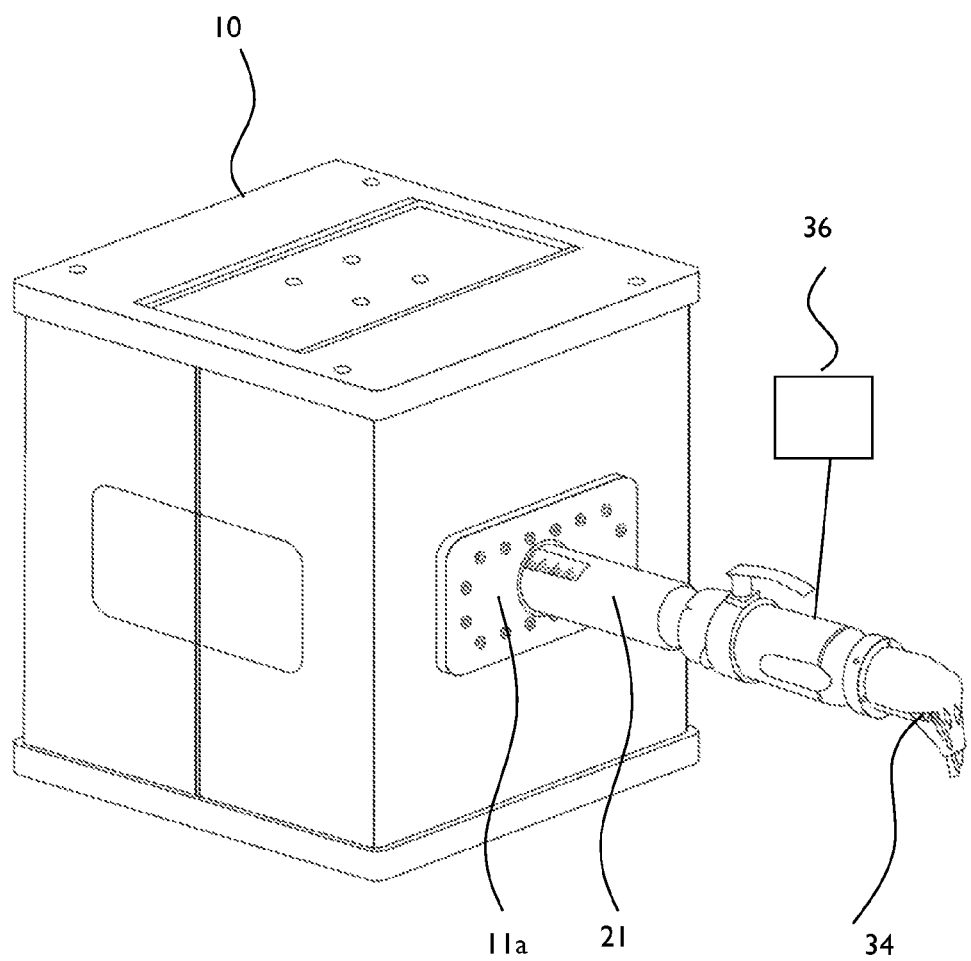
FIG. 1 is a schematic illustration of an embodiment of the invention.
Figure 2:
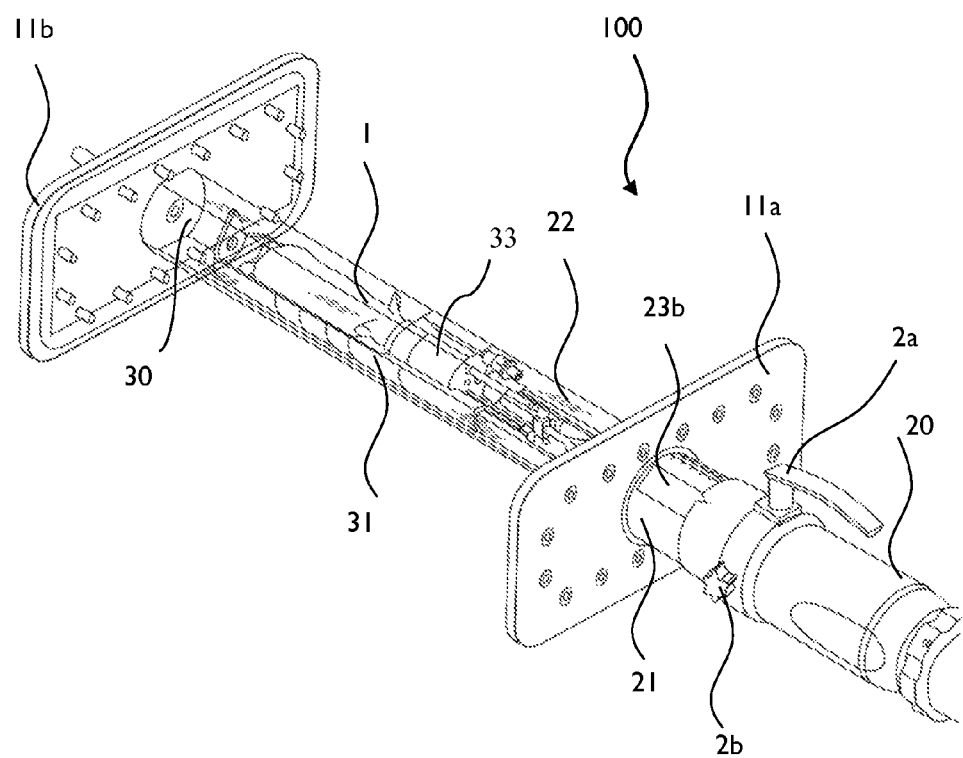
FIG. 2 is a schematic illustration of an embodiment of the invention.

Reference is now made to FIG. 1, schematically illustrating (not to scale) an MRD 10, here, an MRI device, comprising at least one opening with an associated flange 11a. A mouse handling system (MHS) 100 is inserted within opening 11a. Additionally, an anaesthetization gas inlet 34 and an air suction scavenging device 36 are illustrated. Reference is made to FIG. 2 where the MHS 100 is an exemplary maneuverable elongated device, characterized by a substantially circular cross section, having a proximal portion 20, held outside the MRD 10, and a distal portion 30; the proximal portion 20 comprising an outer shaft 21a and an inner shaft 21b. The maneuverable MHS 100 can rotate and/or linearly reciprocate along the main longitudinal axis of the proximal and distal portions 20, 30. The outer shaft 21a is slidable over the inner shaft 21b, providing a telescopic mechanism of a variable length.

Further reference is made to FIG. 2, schematically illustrating in an out of scale manner the MRD 10 opening 11a and its opposite end, opening 11b. MHS 100 is inserted within the opening 11a. The distal portion 30 of the MHS 100 comprises a plurality of levers and handles (see 2a and 2b) which lock the position of the maneuverable MHS 100, and a connection mechanism, by means of a plurality of fluid-connecting (not shown), adapted to communicate the encapsulated environment of the distal portion 30 with the proximal portion 20. The proximal portion 20 of the MHS 100 comprises a plurality of indication marks, such as a rotation indication 23b, positioned on the inner shaft 21b, which indicates the relative position of the MHS 100 in respect to the MRD 10. According to one embodiment of the invention, the distal portion 30 of the MHS 100 is an airtight capsule 30a comprising a shell 22, an animal bed or cradle 31, a room for the analyzed animal 1 and a fluid supplying mechanism 33. The role of the shell 22, inter alis, is (i) to form an airtight capsule to prevent leakage of an -anaesthetization gas from the gas supply inlets to the laboratory; (ii) to provide thermal isolation between ambient air to the air-conditioned animal's environment; (iii) to avoid an accidental spillage of hazardous materials, such as radioactive agents etc. outside the encapsulated environment in which the analyzed animal (e.g. the mouse) is confined.

Figure 3:
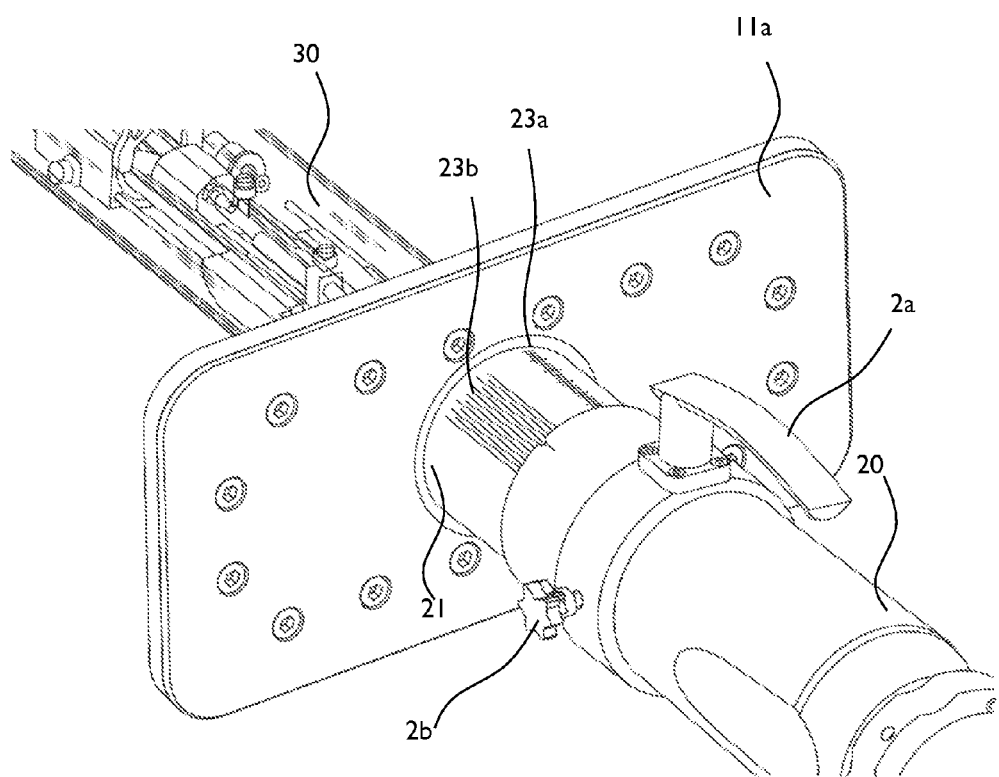
FIG. 3 is a schematic illustration of an embodiment of the invention.

Reference is now made to FIG. 3, schematically illustrating in an out of scale manner the MRD opening 11a and a detailed view of indication marks 23a and 23b. The telescopic mechanism of at least one inner shaft 21b and at least one outer shaft 21a is manipulated by the MRD-operator to position the animal to be analyzed within the center of the field of view, the center of the volume of interest and/or in a position of maximum magnetic field homogeneity, highest resolution etc. Once the animal is placed in the required location by means of displacement and rotation, the MHS 100 configuration is locked by means of levers and knobs, see e.g., 2a and 2b.

Figure 4:
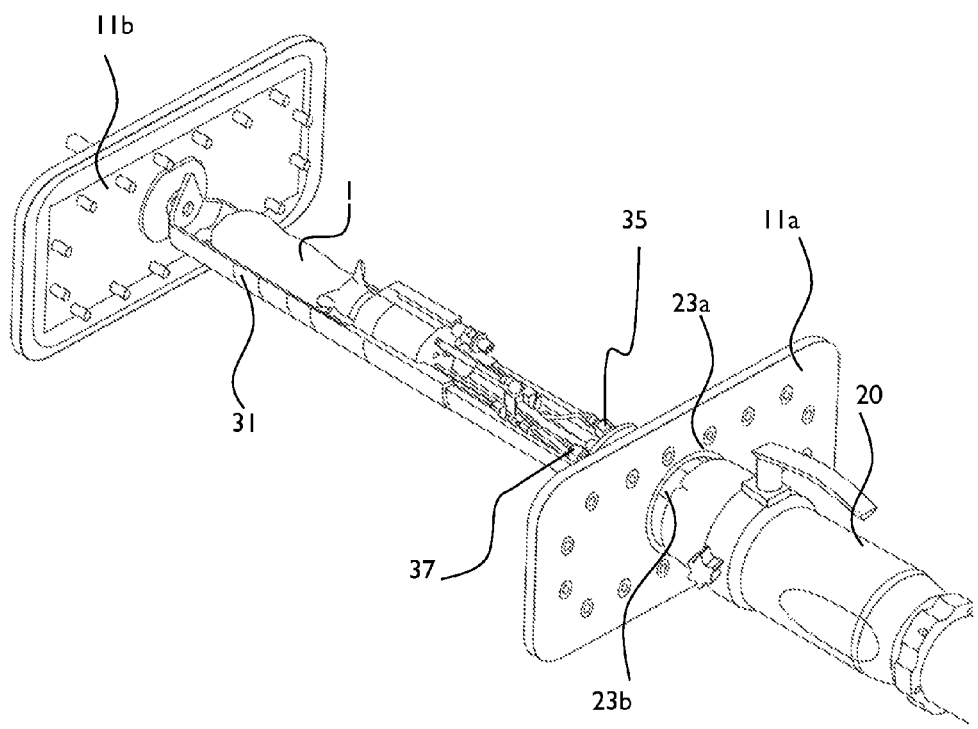
FIG. 4 is a schematic illustration of an embodiment of the invention.

Reference is now made to FIG. 4, (not to scale) schematically illustrating the MHS 100 in a distal (40 mm) &)horizontal)(180°) configuration, i.e., animal 1 is reciprocally displaced distally, towards wall 11b and away from the opening 11a, where cradle 31 immobilizing the animal is placed horizontally. Indication marks 23a and 23b indicate the same. Additionally, an anaesthetization gas outlet 35 and an air suction outlet 37 are shown.

Figure 5:
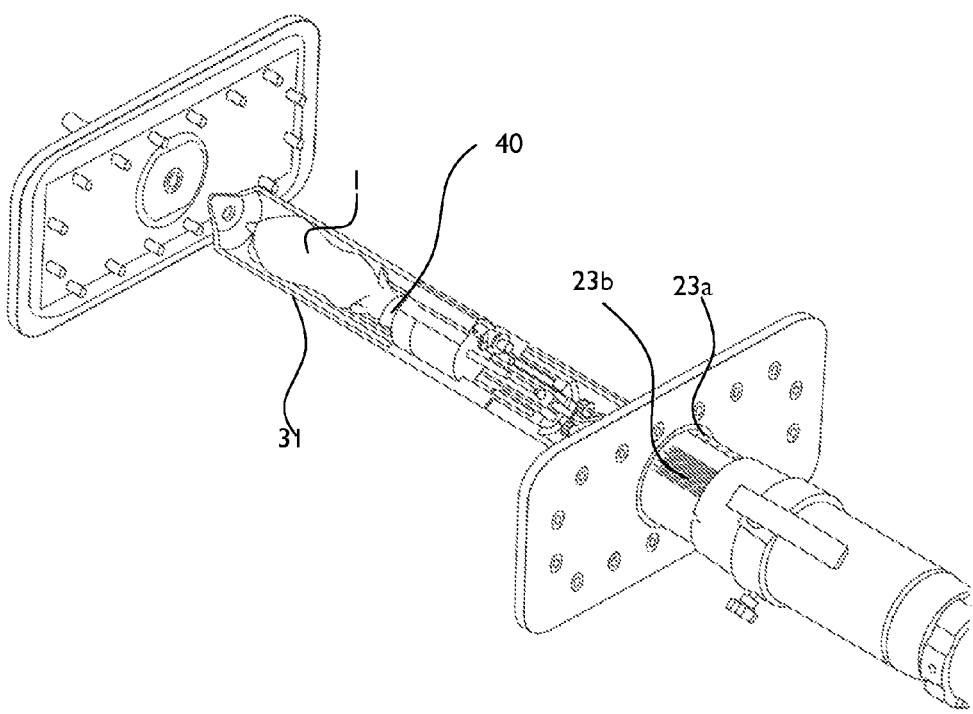
FIG. 5 is a schematic illustration of an embodiment of the invention.
Figure 6:
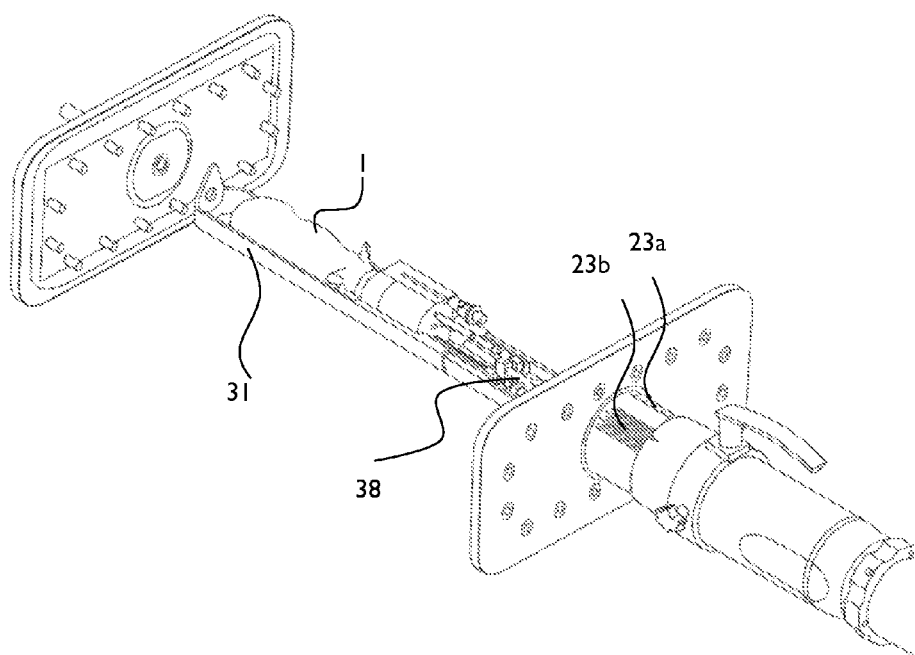
FIG. 6 is a schematic illustration of an embodiment of the invention

Reference is now made to FIG. 5, schematically illustrating (not to scale) the MHS 100 in a proximal (0 mm) & angled (135°, configuration i.e., animal 1 is positioned within the center of the MRD, where cradle 31 immobilizing the animal is placed at an angle of 45° to the horizontal plane. Indicialndication marks 23a and 23b indicate the same. Moreover an anaesthetization gas mask 40 is illustrated. Reference is now made to FIG. 6, schematically illustrating (not to scale) the MHS 100 in a proximal (0 mm) & horizontal (180°), configuration i.e., animal 1 is positioned within the center of the MRD, where the cradle 31 immobilizing the animal is placed horizontally.

Indication marks 23a and 23b indicate the same. Furthermore, air conditioning tubes 38 are illustrated.

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We hereby claim:

1. A maneuverable animal handling system (MHS), useful for positioning an immobilized animal in variable configurations within a medical device, comprising:
    a. a proximal portion, held outside said medical device, comprising at least one inner shaft, and at least one outer shaft, said at least one outer shaft telescopically maneuverable along said at least one inner shaft to provide a maneuverable telescoping mechanism of a variable length of said proximal portion; and
    b. a distal portion comprising a configurable airtight encapsulatable life support system (ELSS) and a shell configured to envelope said ELSS, said ELSS being (i) operatively connected to at least said at least one inner shaft and (ii) selectively movable within said shell via manipulation of said at least one inner shaft while said ELSS is in use and in said medical device,
    wherein said maneuverable telescoping mechanism of said proximal portion has an incremental rotation configuration that permits incremental rotation while said ELSS is in use and in said medical device, and
    wherein said proximal portion comprises indication marks configured to measure and indicate changes in incremental linear and rotational displacements of said ELSS of said distal portion relative to said medical device when said ELSS is located in said medical device so that a position of said ELSS is selectively changeable within said medical device when said ELSS is located in said medical device.

2. The MHS of claim 1, further comprising:
    c. a cradle or bed adapted by means of size and shape to accommodate said animal;

d. an anaesthetization gas mask (AGM) characterized by a cup with a conical shape, and said AGM comprising a plurality of apertures located at an outer circumference of said cup; and e. a fluid supplying mechanism (FSM) in which said AGM is placed, said FSM is in a continuous fluid communication with (i) an anaesthetization gas inlet positioned outside said ELS S and an outlet located within said ELSS; (ii) an air suction scavenging device positioned outside said ELSS and said mask and an air suction outlet located within said ELSS; and a plurality of (iii) air conditioning tubes, wherein said airtight ELSS prevents leakage of said anaesthetization gas from said ELSS outwardly to a laboratory; provides thermal isolation between ambient air and an air-conditioned animal environment; and prevents accidental spillage of hazardous materials from said ELSS to said laboratory.

3. The MHS as defined in claim 1, wherein said medical device is a magnetic resonance device (MRD).

4. The MHS as defined in claim 2, wherein said AGM, said FSM and mechanisms thereof are adapted by means of size and shape, to ensure anaesthetization of animals, especially laboratory animals.

5. The MHS as defined in claim 3, wherein said AGM, said FSM and mechanisms thereof are adapted by means of size and shape, to ensure anaesthetization of animals, especially laboratory animals.

* * * * *